United States Patent [19]

Büchler et al.

[11] Patent Number: 5,570,328
[45] Date of Patent: Oct. 29, 1996

[54] OPTICAL SCANNING DEVICE WITH COARSE AND FINE SCANNING CONTROL

[75] Inventors: Christian Büchler, VS-Marbach; Gerhard Weissmann, Villingen-Schwenningen, both of Germany

[73] Assignee: Deutsche Thomson-Brandt GmbH, Villingen-Schwenningen, Germany

[21] Appl. No.: 400,432

[22] Filed: Mar. 3, 1995

Related U.S. Application Data

[63] Continuation of Ser. No. 107,179, filed as PCT/EP92/00230 Feb. 4, 1992, abandoned.

[30] Foreign Application Priority Data

Feb. 8, 1991 [DE] Germany .................. 41 03 854.1

[51] Int. Cl.[6] ........................ G11B 7/00; G11B 11/00
[52] U.S. Cl. ................ 369/13; 369/44.23; 369/44.29; 369/44.32
[58] Field of Search ............... 369/13, 116, 44.38, 369/121, 48, 44.14, 44.39, 44.36, 32, 44.29, 44.35, 44.28, 109, 111, 112, 44.23; 360/59, 114; 428/694

[56] References Cited

U.S. PATENT DOCUMENTS

| | | | |
|---|---|---|---|
| 4,507,763 | 3/1985 | Kato | 369/44.26 |
| 4,686,662 | 8/1987 | Baer | 369/44.14 |
| 5,173,885 | 12/1992 | Iiyori et al. | 369/13 |
| 5,208,792 | 5/1993 | Imanaka | 369/44.38 |
| 5,245,597 | 9/1993 | Lee et al. | 369/44.28 |
| 5,412,634 | 5/1995 | Buchler et al. | 369/44.23 |
| 5,452,276 | 9/1995 | Bass | 369/44.29 |

FOREIGN PATENT DOCUMENTS

| | | |
|---|---|---|
| 0322841 | 7/1989 | European Pat. Off. . |
| 0339940 | 11/1989 | European Pat. Off. . |
| 0391627 | 10/1990 | European Pat. Off. . |

*Primary Examiner*—Ali Neyzari
*Attorney, Agent, or Firm*—Joseph S. Tripoli; Eric P. Herrmann

[57] ABSTRACT

An optical scanning device includes an object lens for focusing a light beam onto a recorded medium having a helical data track. A tracking regulation circuit guides the object lens along the data track. The tracking regulation circuit includes a coarse drive circuit for driving the optical scanning device and a fine drive circuit for adjusting the object lens. The optical scanning device and the object lens have optical axes which normally are aligned. Deviations of the optical axes from alignment are measured and regulation signals are generated for the coarse drive circuit in accordance with the deviations.

7 Claims, 5 Drawing Sheets

$HF = AS + BS + CS + DS$ $FE = (AS + CS) - (BS + DS) = 0$ $TE = ES - FS = 0$ $FE = (AS + CS) - (BS + DS) = 0$ $TE = ES - FS < 0$ $FE = (AS + CS) - (BS + DS) = 0$ $TE = ES - FS > 0$

OPTICAL SCANNING DEVICE WITH COARSE AND FINE SCANNING CONTROL

This is a continuation of PCT application PCT/EP92/00230 filed Feb. 4, 1992 by Gerhard Weissmann and Christian Buchler and titled "Optical Scanning Device".

This is a continuation of application Ser. No. 08/107,179, filed Jul. 29, 1993 now abondoned.

BACKGROUND OF THE INVENTION

The invention relates to an optical scanning device in which a light beam is focused onto a rotating recording medium. The beam is guided along the data tracks of the recording medium by a tracking regulation circuit which includes a coarse drive for adjusting the optical scanning device and a fine drive for guiding the objective lens.

In a compact disk player the recording medium, the compact disk, is scanned by a light beam. The design and function of an optical scanning device, a so-called optical pick-up, are described in Electronic Components & Applications, Vol. 6, No. 4, 1984, on pages 209 through 215. The light beam from a laser diode is focused onto the disk by lenses and reflected onto a photodetector from the disc. The data stored on the disk and the values for the focusing circuit and for the tracking regulation circuit are obtained from the output signal of the photodetector In the publication cited above the deviation of the feedback value for the focusing regulation circuit is designated "focusing error" while the term "radial tracking error" is chosen for the deviation of the feedback value from the desired value of the tracking regulation circuit.

A coil serves as the actuator for the focusing regulation circuit. The magnetic field of the coil moves an object lens along the optical axis. The focusing regulation circuit moves the objective lens to insure that the light beam emitted from a laser diode is always focused onto the disk. Using the tracking regulation circuit, also often referred to as radial drive, the optical scanning device can be shifted in the radial direction with respect to the disk. Thus, the light beam can be guided along the helical data tracks of the compact disk.

With some apparatus the radial drive includes a coarse drive and a fine drive. The coarse drive typically is a threaded spindle which drives the entire optical scanning device including the laser diode, the lenses, the prismatic beam splitter, and the photodetector. The fine drive is used to shift the light in the radial direction. The light beam can therefore be displaced a small distance, e.g. about 1 ram, along the radius of the compact disk.

The attainment of accurate reproduction of the recorded data irrespective of whether the recording is a video disc, compact disc or a magneto-optical disk, requires precise focusing of the light beam on the disk and precise tracking along the data tracks of the disk. In FIG. 1 the photodetector PD of the optical scanning device of a compact disk player is shown with three laser beams L1, L2, L3 focused onto the disk. The laser beams L2 and L3 respectively are the +1 and −1 level diffracted beams. A scanning device of this type is called, in the above named citation, a three-beam-pick-up because it operates with three light beams.

In the photodetector four square-shaped photodiodes A, B, C and D are assembled to form a square. Two rectangular photodiodes E and F lie on opposite sides of the detector. The middle laser beam L1, which is focused onto the four photodiodes A, B, C and D, generates the data signal HF=AS+BS+CS+DS and the focusing error signal FE=(AS+CS)−(BS+DS). The two outermost light beams L2 and L3, the front one of which L2 falls upon the photodiode E while the back one L3 hits the photodiode. F, generate the tracking error signal TE=ES−FS. The designations AS, BS, CS, DS, ES, and FS denote the photovoltages of the diodes A, B, C, D, E and F respectively.

In FIG. 1 the middle light beam L1 exactly follows the center of a track S and the tracking error signal TE has the value zero.

$TE=ES-FS=0.$

FIG. 2 illustrates the case where the laser beams L1, L2 and L3 are shifted towards the right from the track S. In this condition FS>ES and the tracking error signal assumes a negative value:

$TE=ES-FS<0.$

The actuator of the tracking regulation circuit moves the optical scanning device to the left until the tracking error signal TE becomes zero.

In the opposite case shown in FIG. 3 the laser beams are displaced from the track towards the left side and the tracking error signal is positive: TE=ES−FS>0. The tracking regulation circuit moves the optical scanning device to the right until the tracking error signal TE becomes zero.

The generation of the tracking error signal utilizes the diffracting property of the pits or the preprinted track. When the light beam is reflected from the center of the track the light intensity of the circular light spot on the photodiode E or F decreases; depending on the direction from which the light beam exits the track, radially inwardly or outwardly, the light spot on the photodiode E or F becomes brighter while it becomes darker on the other photodiode. This difference in brightness is utilized by a difference amplifier D1 to generate the tracking error signal TE.

In order for the light beam to follow the data track to be scanned, which because the disc is eccentric moves radially in a staggering manner, the fine drive radially moves the objective lens so that it follows the eccentric motion of the disk. However, in order to be able to guide the light beam along the data tracks it is necessary to switch on the coarse drive continuously or in time intervals so that it can re-adjust the optical scanning device because the regulating range of the fine drive covers only about 100 data tracks. The re-adjustment of the scanning device by the coarse drive should occur in such a manner that the fine drive can operate equally in both directions That is, while scanning a data track the fine drive should be maintained in the center position so that is able to radially adjust approximately the same number of data tracks inwardly or outwardly.

With a known optical scanning device which utilizes the three beam principle the tracking error signal TE (the deviation of the feedback value from the desired value) is fed to the input of a PID controller the output of which is coupled to the actuator of the fine drive and to an integrator. The output of the integrator is coupled to the actuator of the coarse drive, an electric motor, which drives the spindle. The regulating voltage at the output of the integrator causes the coarse drive to be re-adjusted in such a way that the mean value of the regulating voltage at the output of the ID controller becomes zero. Thus, the objective lens is translated about its mechanical center position which it assumes at a regulating voltage of 0.V. The mechanical center position of the objective lens is determined by springs or other flexible elements which have to be adjusted in such a manner that the optical axis of the objective lens coincides with the optical axis of the optical scanning device. Aging of the springs, and other external forces, such as those of a vehicle, can cause the optical axis of the objective lens to shift and no longer coincide with the optical axis of the optical scanning device. The mechanical center position no longer coincides with the optical center position because it has shifted a little away from the optical center position. Accordingly, when the regulating voltage is the desired zero volts the object lens is no longer situated in the optical center position and the regulating range of the fine drive is no longer symmetrical.

SUMMARY OF THE INVENTION

It is an object of the invention to provide an optical scanning device with a tracking regulation circuit having a coarse drive and a fine drive and which maintains the regulating range of the fine drive symmetrical about a selected position. The invention solves this task in that the regulating signal for the coarse drive is generated from a signal which is proportional to the deviation of the optical axis of the objective lens from the optical axis of the optical scanning device.

DETAILED DESCRIPTION

Figure 1:
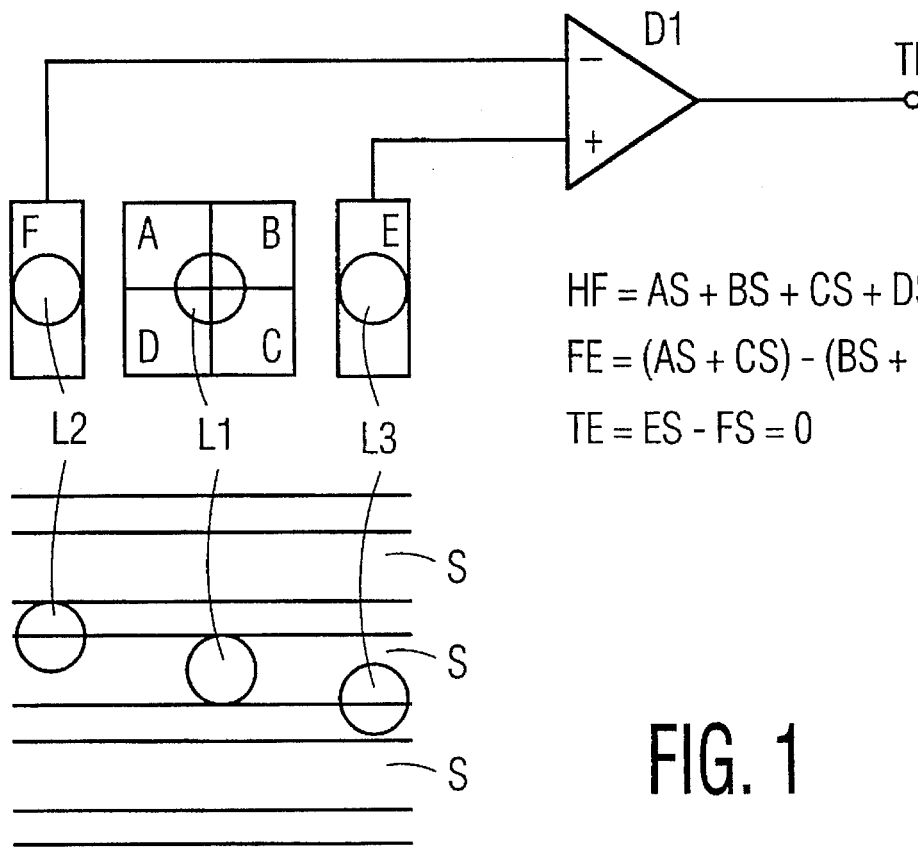
FIGS. 1 to 3 are useful in understanding the operation of the invention.
Figure 2:
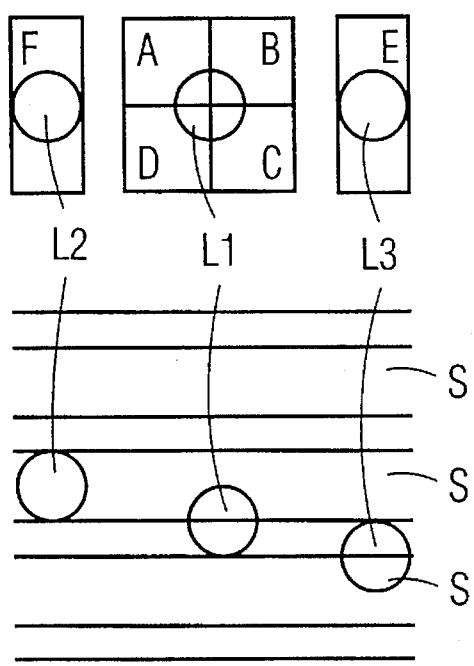
Figure 3:
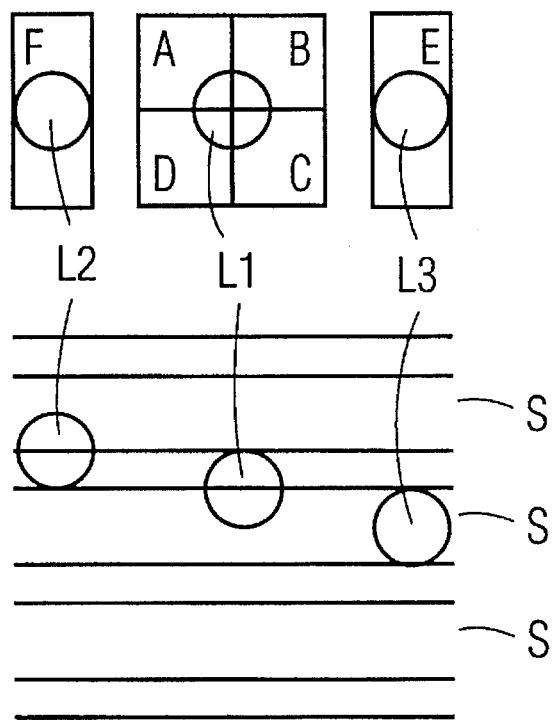
Figure 4:
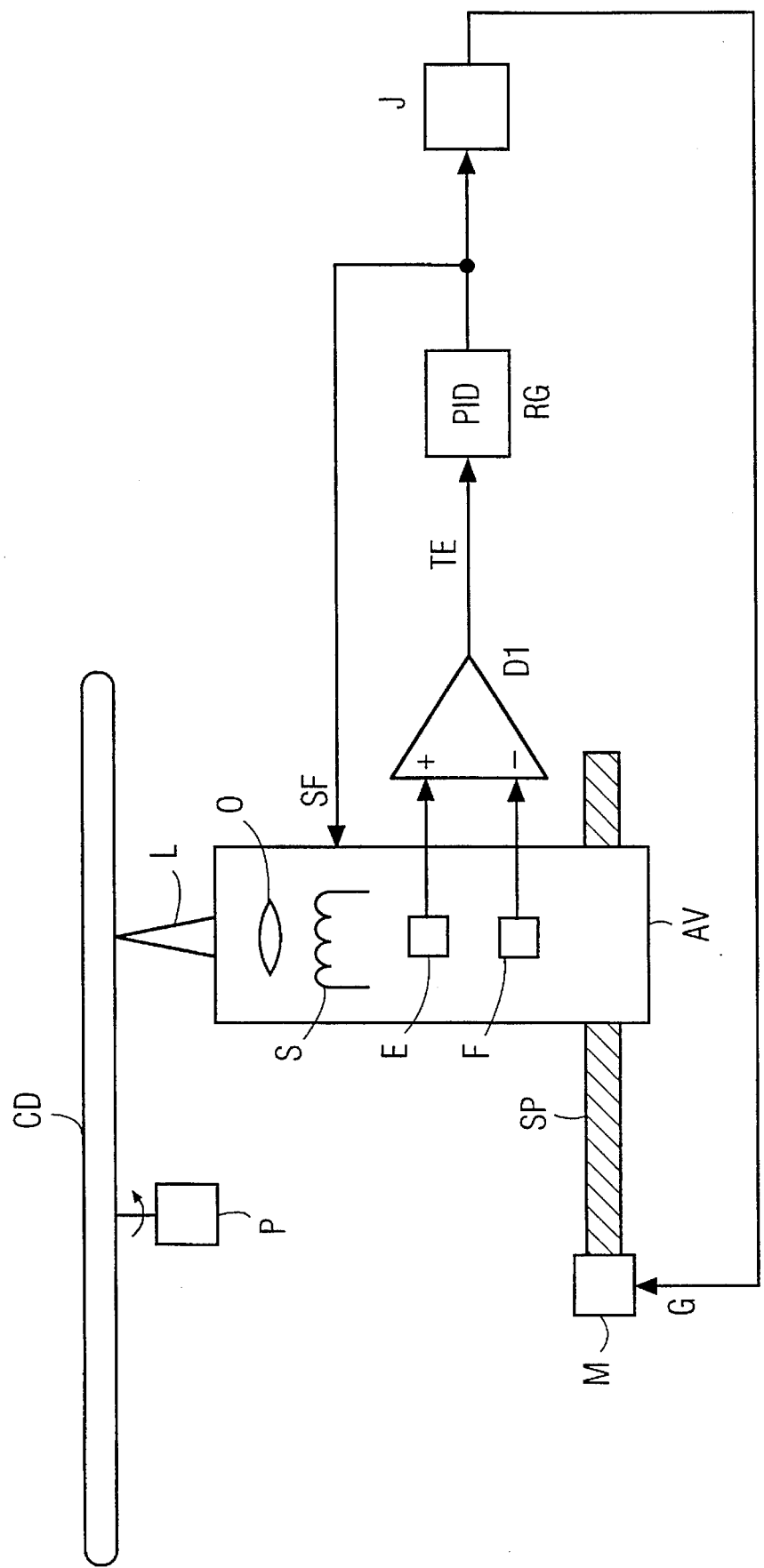
FIG. 4 is a prior art tracking regulation circuit having a coarse and fine drive.

In FIG. 4, a compact disk CD is driven by a motor P and is scanned by means of an optical scanning device AV having a light beam L. The optical scanning device AV includes a coil S, which is the actuator for the fine drive, an objective lens O and two photodiodes E and F. For reasons of clarity, the four quadrant photodetector and the other optical components are not illustrated.

The photodiodes E and F are coupled with the inputs of a differential amplifier D1 which generates the tracking error signal TE=ES−FS. The output of the differential amplifier D1 is coupled with the input of a PID controller RG the output of which is coupled to the input of an integrator J and to the coil S, which is the actuator of the fine drive for moving the objective lens. The output of the integrator J is connected to the actuator of a coarse drive motor M, which drives the spindle SP in order to re-adjust the optical scanning device.

Figure 5:
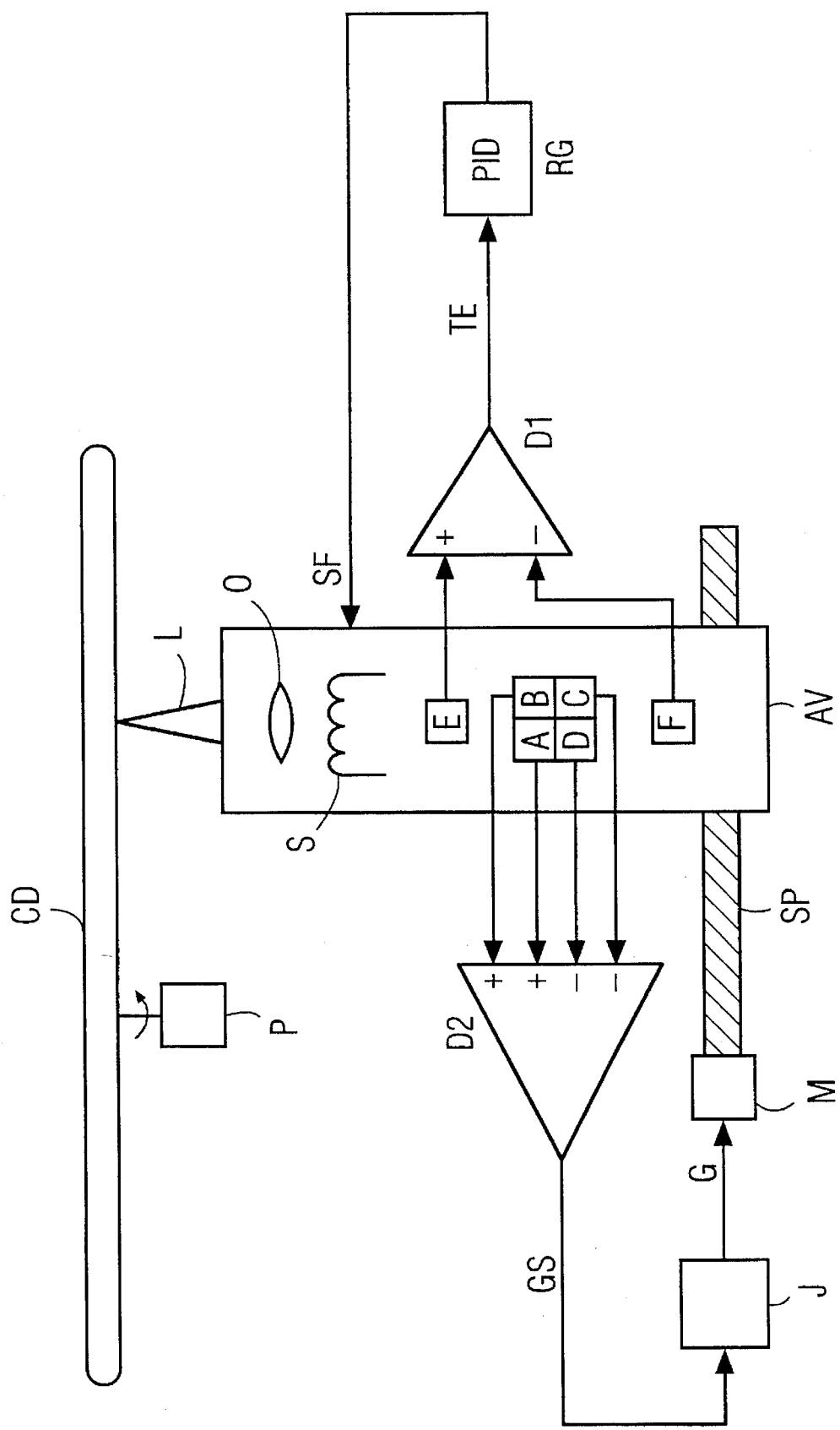
FIG. 5 is a preferred embodiment of the invention.
Figure 6:
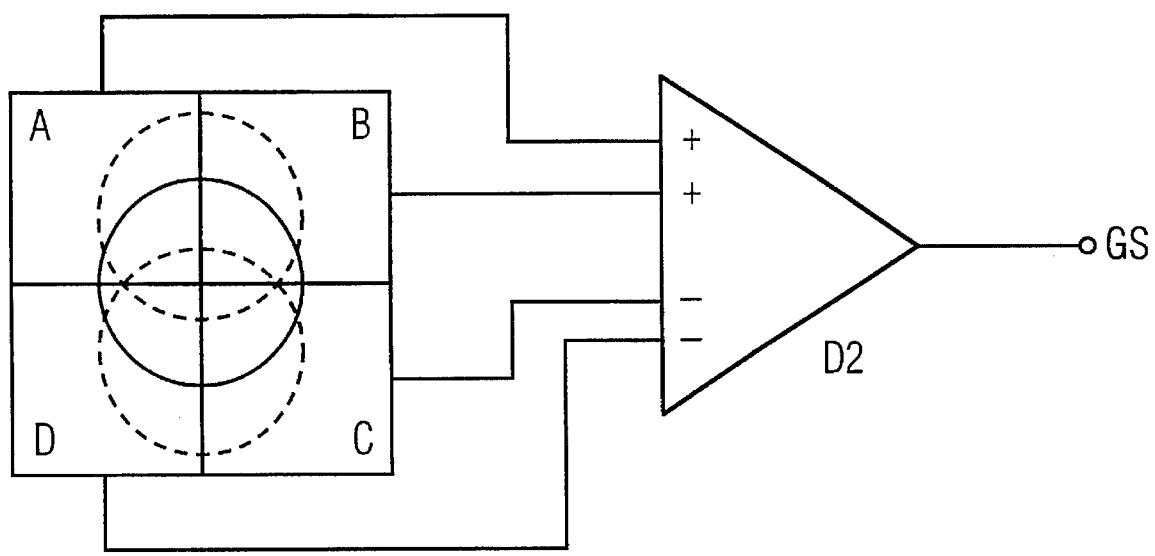
FIG. 6 shows a four quadrant photodetector and a differential amplifier.

The invention is described and illustrated by means of FIGS. 5 and 6. The invention is based upon the fact that the light beam reflected to four quadrant photodetector moves from the center of the four quadrant photodetector when the optical axis of the objective lens moves away from the optical axis of the optical scanning device.

In FIG. 6, as shown by the solid circle, the light spot is centered on the four quadrant photodetector when the optical axis of the objective lens coincides with the optical axis of the scanning device. The two positions of the light spot when the optical axis of the object lens has moved away from the optical axis of the scanning device is indicated by the dotted circles. A differential amplifier D2 generates the signal GS=(AS+BS)−(DS+CS), which is proportional to the deviation of the optical axis of the objective lens from the optical axis of the scanning device.

The invention is described with reference to FIG. 5. A CD disk is driven by a motor P and is scanned by an optical scanning device AV using a light beam L. In addition to an object lens O, the optical scanning device contains other optical components, a laser, and object lens actuator coils S, and a photodetector. The photodetector includes four photodiodes A, B, C and D which generate the data signal and the focusing error signal, and the two photodiodes E and F which generate the tracking error signal. For reasons of better clarity, only the objective lens O, the coil S, the four quadrant photodetector and the photodiodes E and F are drawn in the optical scanning device AV.

The photodiodes E and F are coupled to the inputs of a differential amplifier D1 the output of which is coupled to the input of a PID controller RG. The output of the PID controller RG is connected to the coil S. The photodiodes A, B, C and D of the four quadrant photodetector are connected to the inputs of a differential amplifier D2 the output of which is coupled to the input of an integrator J. The output of the integrator J is connected to the motor M which drive the spindle SP to adjust the optical scanning device AV. The regulating signal SF for the fine drive is generated in accordance with the state of the art. The tracking error signal TE=ES−FS, from the differential amplifier D1 is fed to the input of the PID controller RG the output signal SF of which is applied to the fine adjustment coil S to regulate the fine adjustment of coil S.

The regulating signal G for the coarse drive is derived differently from the prior art systems which derive such a signal from the fine drive regulating signal SF. With the invention, photodiodes A, B, C and D of the four quadrant photodetector are coupled with the inputs of the differential amplifier D2 which generates the signal GS=(AS+BS)−(DS+CS). The integrator J generates the regulating signal G for the coarse drive from the signal GS.

The regulating signal G is proportional to the deviation of the optical axis of the objective lens O from the optical axis of the optical scanning device AV, therefore, the mechanically determined center position of the object lens O no longer adversely affects the symmetry of the regulating range of the fine drive. The coarse drive always re-adjusts the optical scanning device AV in such a way that the regulating range of the fine drive remains symmetrical.

A primary advantage of the FIG. 5 embodiment is that the four quadrant photodetector which generates the data signal and the focusing error signal also generates the regulating signal G for the coarse drive. Another advantage is that no mechanical means is required to determine the mechanical center position of the object lens. Also, the fine drive becomes much simpler because it is constructed from fewer mechanical parts. This has the effect that manufacturing costs and costs for keeping parts in stock are reduced.

Moreover, even the regulating process is advantageously affected by the omission of mechanical springs or attenuating elements because the objective lens becomes more easily movable. Accordingly, moving the object lens requires weaker forces than the prior art systems. Therefore, the objective lens reacts more sensitively to changes of the regulating signals that the prior art devices where spring forces and friction counteract the movements of the objective lens caused by the regulating signal. Finally, the danger of resonances which can be caused by the springs or attenuating elements in the prior art devices no longer exists.

The invention is suitable for the optical scanning device of a compact disk player, video disk player, DRAW disk player or a magneto-optical apparatus.

We claim:

1. An optical scanning device comprising:

an objective lens movably mounted in said scanning device, for focusing a light beam onto a track of a recording medium, said scanning device and said objective lens having respective optical axes which normally are aligned;

a first detector, responsive to reflected light from said recording medium, for generating coarse drive signals;

a photodetector, different from said first detector, and responsive to reflected light from said recording medium, for generating fine drive signals;

a tracking regulation circuit for guiding said objective lens along said data track, said tracking regulation circuit including a coarse drive circuit, for radially translating said optical scanning device, and a fine drive circuit, for adjusting said objective lens within said optical scanning device;

means for concurrently applying during normal tracking operation, said coarse and fine drive signals respectively to said coarse and fine drive circuits for maintaining the axes of the scanning device and the objective lens substantially in alignment.

2. An optical scanning device comprising:

an objective lens movably mounted in said scanning device, for focusing a light beam onto a track of a recording medium;

a tracking regulation circuit for guiding said objective lens along said data track, said tracking regulation circuit including a coarse drive circuit, responsive to a four quadrant photodetector for radially translating said optical scanning device and a fine drive circuit, responsive to a second photodetector including two unitary photodetectors which are located adjacent said four quadrant photodetector but not included in said four quadrant photodetector, for adjusting said objective lens within said optical scanning device, said optical scanning device and said objective lens having respective optical axes which normally are aligned, and wherein said first and second photodetectors are responsive to light reflected from said recording medium;

a first differential amplifier responsive to said two unitary photodetectors for generating fine drive regulating signals and a second differential amplifier responsive to said four-quadrant photodetector for providing coarse drive regulation signals; and means for concurrently applying control signals, during normal tracking operation, to said coarse and fine drive circuits for compensating for misalignment between the axes of the optical scanning device and the objective lens, and generating regulation signals for said coarse drive circuit in accordance with said misalignment.

3. In an optical scanning device of the type in which three light beams are focused along a track of a rotating recording medium by means of an objective lens mounted in said optical scanning device and guided along data tracks of the recording medium by means of a tracking regulation circuit including a coarse drive apparatus for radially translating the optical scanning device and a fine drive apparatus for radially adjusting the objective lens, and including a four quadrant photodetector for detecting reflected light from a center one of said three light beams for generating at least a recorded data signal, and two further photodetectors for detecting reflected light from the other two of said three light beams for generating a tracking error signal, an improvement comprising:

means for coupling said tracking error signal derived from said two other light beams to said fine drive apparatus for radially adjusting said objective lens; and means for developing a further tracking error signal from signals derived from said four quadrant detector, for controlling said coarse drive apparatus.

4. In an optical scanning device of the type in which three light beams are focused along a track of a rotating recording medium by means of an objective lens mounted in said optical scanning device and guided along data tracks of the recording medium by means of a tracking regulation circuit including a coarse drive apparatus for radially translating the optical scanning device and a fine drive apparatus for radially adjusting the objective lens, and including a four quadrant photodetector for detecting reflected light from a center one of said three light beams for generating at least a recorded data signal, and two further photodetectors for detecting reflected light from the other two of said three light beams for generating a tracking error signal, an improvement comprising:

means for coupling said tracking error signal derived from said two other light beams to said fine drive apparatus for radially adjusting said objective lens;

a difference amplifier arranged to provide a difference signal representing the difference between signals generated by at least two photodetectors of said four quadrant photodetector; and means for coupling the difference signal to said coarse drive apparatus, for controlling said coarse drive apparatus.

5. The optical scanning device set forth in claim 4 wherein said difference amplifier is arranged to generate the difference between a sum of signals from a first pair of photodetectors of said four quadrant photodetector and a sum of signals from a second pair of photodetectors of said four quadrant photodetector.

6. An optical scanning device comprising:

an objective lens movably mounted in said scanning device, for focusing a light beam onto a track of a recording medium;

a tracking regulation circuit for guiding said objective lens along said data track, said tracking regulation circuit including a coarse drive circuit, responsive to a first photodetector for radially translating said optical scanning device and a fine drive circuit, responsive to a second photodetector located adjacent said first photodetector, for adjusting said objective lens within said optical scanning device, said optical scanning device and said objective lens having respective optical axes which normally are aligned, and wherein said first and second photodetectors are responsive to light reflected from said recording medium;

means for concurrently applying control signals, during normal tracking operation, to said coarse and fine drive circuits for compensating for misalignment between the axes of the optical scanning device and the objective lens, and generating regulation signals for said coarse drive circuit in accordance with said misalignment.

7. The optical scanning device set forth in claim 6 wherein said first detector includes a four quadrant photodetector and said second photodetector includes two unitary photodetectors which are located adjacent said four quadrant photodetector but not included in said four quadrant photodetector.

* * * * *